United States Patent
Boyatt, III et al.

(10) Patent No.: US 6,622,582 B1
(45) Date of Patent: Sep. 23, 2003

(54) ASSEMBLY FOR LIMITING AXIAL MOTION OF SHAFT IN AN IMAGING APPARATUS

(75) Inventors: Richard Gordon Boyatt, III, Lexington, KY (US); Larry Steven Foster, Lexington, KY (US); Danny Wayne Peters, Lexington, KY (US); Robert Flynt Strean, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 6 days.

(21) Appl. No.: 09/617,527

(22) Filed: Jul. 14, 2000

(51) Int. Cl.[7] .................. F16H 57/00; F16H 21/32; F16M 11/00
(52) U.S. Cl. .................. 74/410; 74/40; 247/200
(58) Field of Search .................. 74/410, 60, 606 R, 74/606 G; 248/200, 674, 342, 5, 300; 192/82 T, 58.684

(56) References Cited

U.S. PATENT DOCUMENTS

| | | | |
|---|---|---|---|
| 3,946,629 A | | 3/1976 | Achelpohl |
| 4,269,295 A | * | 5/1981 | Kish .................. 192/82 T |
| 4,369,668 A | | 1/1983 | Pollak-Banda et al. |
| 4,408,526 A | | 10/1983 | Mathes |
| 4,641,543 A | | 2/1987 | Jessup |
| 4,876,908 A | | 10/1989 | Pengilly |
| 5,019,861 A | | 5/1991 | Surti |
| 5,454,648 A | | 10/1995 | Lee |
| 5,524,860 A | * | 6/1996 | Ives .................. 248/674 |
| 5,559,581 A | | 9/1996 | Sugiura et al. |
| 5,570,160 A | | 10/1996 | Miwa et al. |
| 5,585,889 A | | 12/1996 | Shishido et al. |
| 5,761,580 A | | 6/1998 | Harada et al. |
| 5,768,658 A | | 6/1998 | Watanabe et al. |
| 5,878,310 A | | 3/1999 | Noda et al. |
| 5,901,950 A | | 5/1999 | Kobayashi et al. |
| 5,905,927 A | | 5/1999 | Inoue et al. |
| 5,925,954 A | * | 7/1999 | Gillieron .................. 248/672 |
| 5,926,673 A | | 7/1999 | Foster et al. |
| 5,933,934 A | | 8/1999 | Giannetti |
| 5,936,654 A | | 8/1999 | Yokoyama et al. |
| 5,964,150 A | | 10/1999 | Kato et al. |
| 6,021,291 A | | 2/2000 | Karakama et al. |
| 6,032,949 A | | 3/2000 | Ando |
| 6,047,153 A | | 4/2000 | Kawaguchi |
| 6,059,285 A | | 5/2000 | Suga et al. |
| 6,059,406 A | | 5/2000 | Richtsmeier et al. |
| 6,064,842 A | | 5/2000 | Takeuchi et al. |
| 6,064,843 A | | 5/2000 | Isobe et al. |
| 6,131,863 A | * | 10/2000 | Fiacco .................. 248/200 |
| 6,158,302 A | * | 12/2000 | Becker et al. .................. 74/606 R |
| 6,234,278 B1 | * | 5/2001 | Loken et al. .................. 248/674 |

\* cited by examiner

*Primary Examiner*—Marcus Charles
(74) *Attorney, Agent, or Firm*—Taylor & Aust, P.C.

(57) ABSTRACT

An assembly for limiting axial motion of a shaft, such as a roller, in an imaging apparatus having a frame, a drive system including a helical drive gear, a shaft supported by the frame and a driven helical gear attached to the shaft and positioned to engage the helical drive gear, wherein driving the driven helical gear in a first rotational direction results in an axial thrust of the shaft in a first axial direction. The assembly includes a thrust member which has an engagement end and a mounting end. The engagement end has a first cross-sectional dimension and the mounting end has a second cross-sectional dimension that is larger than the first cross-sectional dimension. The thrust member is positioned to be co-axial with the shaft and is coupled to at least one of the shaft and the driven helical gear. A thrust bracket is mounted to the frame. The thrust bracket has a contact surface that is engaged by the engagement end of the thrust member when the driven helical gear is driven in the first rotational direction.

21 Claims, 7 Drawing Sheets

ASSEMBLY FOR LIMITING AXIAL MOTION OF SHAFT IN AN IMAGING APPARATUS

BACKGROUND OF THE INVENTION

1. Field of the Invention

The present invention relates to an imaging apparatus, and, more particularly, to an assembly for limiting axial motion of a shaft in an imaging apparatus.

2. Description of the Related Art

A typical ink jet printer has a reciprocating printhead carriage carrying a printhead in a path transverse to a print media path. A sheet of print media is transported in an indexed manner under the printhead by a feed roller, and the printhead is scanned in a reciprocating manner across the width of an image area on the sheet of print media. The printhead is controlled to expel droplets of ink on the sheet of print media to form an image from a multitude of ink dots. A platen is provided opposite to the printhead for contacting the non-printed side of the print media and, in part, defines the distance between the printhead and the sheet of print media.

In an ink jet printer, dot placement is critical to achieve acceptable print quality. The mechanism that indexes the print media, i.e., the feed roller, must do so with extreme precision. One form of dot placement error is caused by the axial motion of the feed roller, wherein the media position at the beginning of a given swath is displaced from the media position at the beginning of an adjacent swath. This axial motion is a result of indexing system components, for example shafts, which possess unacceptable levels of run out during the indexing operation, resulting in horizontal print registration errors.

What is needed in the art is an apparatus which minimizes the axial motion of a feed roll during the indexing operation, so as to reduce the occurrence of horizontal print registration errors.

SUMMARY OF THE INVENTION

The present invention provides an apparatus that minimizes the axial motion of a feed roll during the indexing operation, so as to reduce the occurrence of horizontal print registration errors.

The invention comprises, in one form thereof, an assembly for limiting axial motion of a shaft in an imaging apparatus. Such an imaging apparatus has a frame and a drive system including a helical drive gear. A shaft is provided that is supported by the frame. A driven helical gear is attached to the shaft and positioned to engage the helical drive gear, wherein driving the driven helical gear in a first rotational direction results in an axial thrust of the shaft in a first axial direction. The assembly includes a thrust member and a thrust bracket. The thrust member is provided with an engagement end and a mounting end. The engagement end has a first cross-sectional dimension and the mounting end has a second cross-sectional dimension that is larger than the first cross-sectional dimension. The thrust member is positioned to be co-axial with the shaft and is coupled to at least one of the shaft and the driven helical gear. The thrust bracket is mounted to the frame. The thrust bracket has a contact surface that is engaged by the engagement end of the thrust member when the driven helical gear is driven in the first rotational direction.

An advantage of the present invention is that the axial motion of a shaft in one direction of shaft rotation is reduced to essentially zero as the thrust member contacts the contact surface of the thrust bracket.

Another advantage is that when the invention is applied to an indexed feed roller in an ink jet printer, the amount of horizontal print registration error resulting from an axial motion of the feed roller is reduced to essentially zero.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 1:
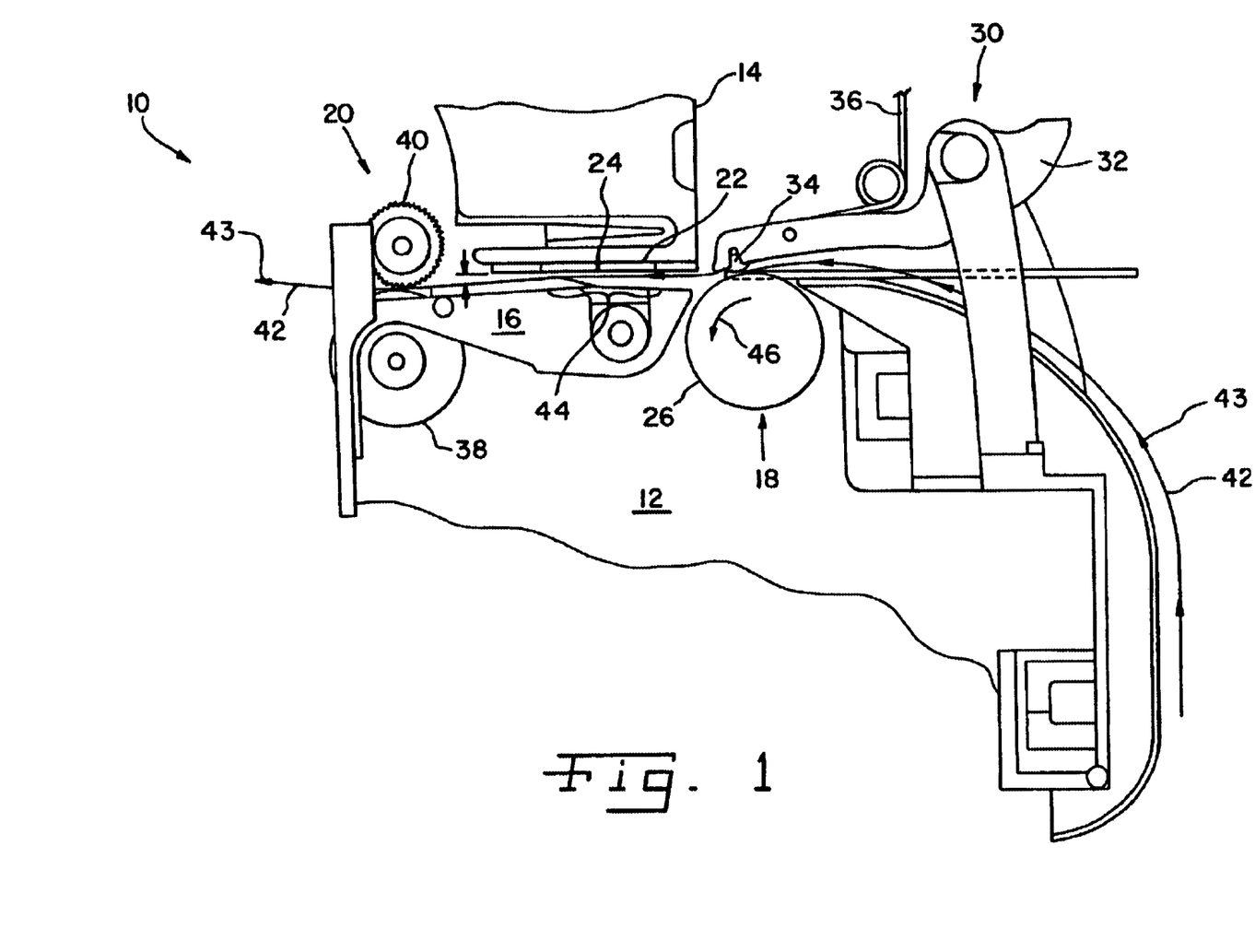
FIG. 1 is a schematic side view of an ink jet printer embodying the invention.

Referring now to the drawings and particularly to FIG. 1, there is shown an ink jet printer 10 including a printer frame 12, a printhead cartridge 14, a platen assembly 16, a feed roller assembly 18 and an exit roller assembly 20. Printhead cartridge 14 is carried by a printhead carriage drive system (not shown) in a reciprocating manner well known in the art. Printhead cartridge 14 includes a printhead 22 having a surface including a nozzle plate 24 containing a plurality of nozzles for controllably expelling ink droplets onto a sheet of print media.

Feed roller assembly 1 8 includes a feed roller 26, and a back-up roller assembly 30. Feed roller 26 is rotatably mounted to frame 12 via bearings (not shown). Preferably, feed roller 26 is formed from a hollow cylindrical shaft. Alternatively, feed roller 26 may be formed as a solid shaft having a covering, such as rubber. Back-up roller assembly 30 includes a lever 32 pivotally coupled to frame 12, a plurality of back-up rollers 34 rotatably coupled to lever 32 and a spring 36 for applying a force to press back-up rollers 34 toward feed roller 26. Those skilled in the art will recognize that in practice feed roller 26 may be a single roller, or multiple rollers.

Exit roller assembly 20 includes an exit roller 38 and a plurality of star wheel rollers 40. Typically, exit roller.38 is a driven roller, and each of star wheel rollers 40 are spring loaded into contact with exit roller 38. Those skilled in the art will recognize that in practice exit roller 38 may be a single roller, or multiple rollers.

During a printing operation, print media is transported in a manner known in the art along a media path 42 in a media feed direction 43, as depicted by the arrows of line 42, between feed roller 26 and back-up rollers 34 and past printhead 22. The bi-directional path traveled by printhead nozzle plate 24 defines a print zone 44 within which the transported sheet of print media will be printed. As will be described in more detail below, feed roller assembly 18 incrementally indexes a sheet of print media past printhead nozzle plate 24 by rotating feed roller 26 in the direction indicated by arrow 46, and exit roller assembly 20 receives the printed sheet between exit roller 38 and star wheel rollers 40 to advance the printed sheet out of ink jet printer 10.

Figure 2:
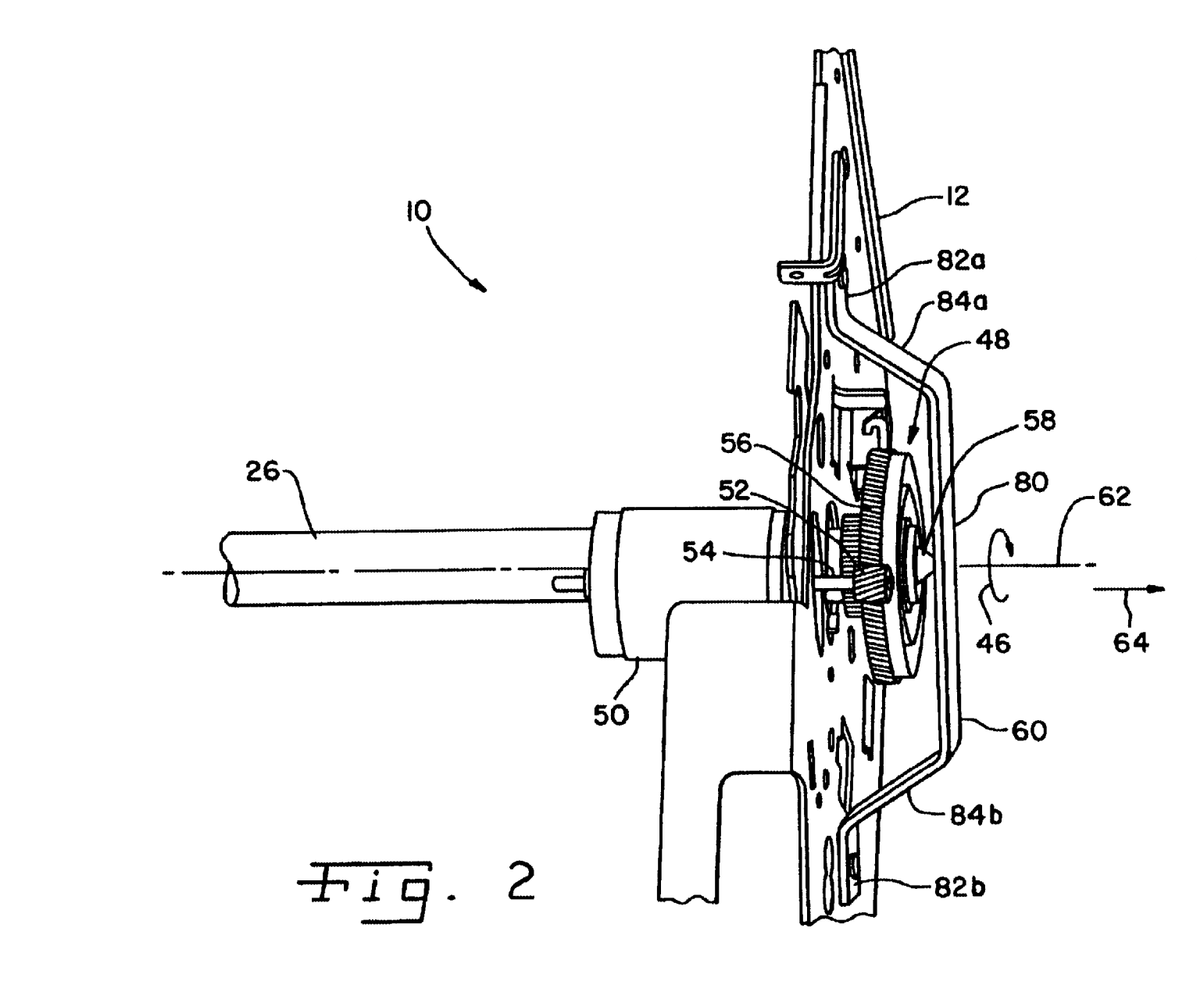
FIG. 2 is a perspective view depicting the thrust member and thrust bracket of the invention.

Referring now to FIG. 2, shown in partial perspective is a portion of ink jet printer 10 depicting the driven end 48 of feed roller 26. As shown, ink jet printer 10 further includes a motor 50 (such as a stepper motor or a DC motor), a helical drive gear 52, driven helical gear 56, a thrust member 58 and a thrust bracket 60. Helical drive gear 52 is attached to a shaft 54 of motor 50 for cooperative rotation therewith. Driven helical gear 56 is attached to driven end 48 of feed roller 26 and is positioned to engage helical drive gear 52, wherein driving the driven helical gear 56 in rotational direction 46 about shaft axis 62 results in an axial thrust of feed roller 26 in an axial direction 64, thereby forcing thrust member 58 into contact with a contact surface 66 of thrust bracket 60, as shown in FIG. 4.

Figure 3:
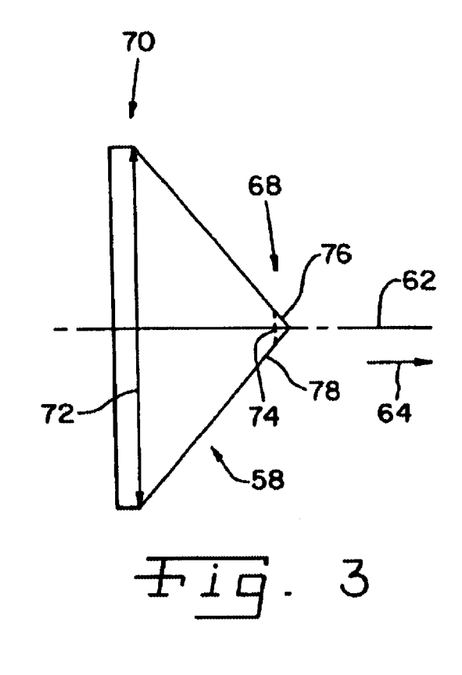
FIG. 3 is a side view of the thrust member of the invention.

Referring to FIG. 3, thrust member 58 has an engagement end 68 and a mounting end 70. Preferably, as shown in FIG. 3, engagement end 68 has a first cross-sectional dimension 72 and mounting end 70 has a second cross-sectional dimension 74 that is larger than first cross-sectional dimension 72.

Figure 4:
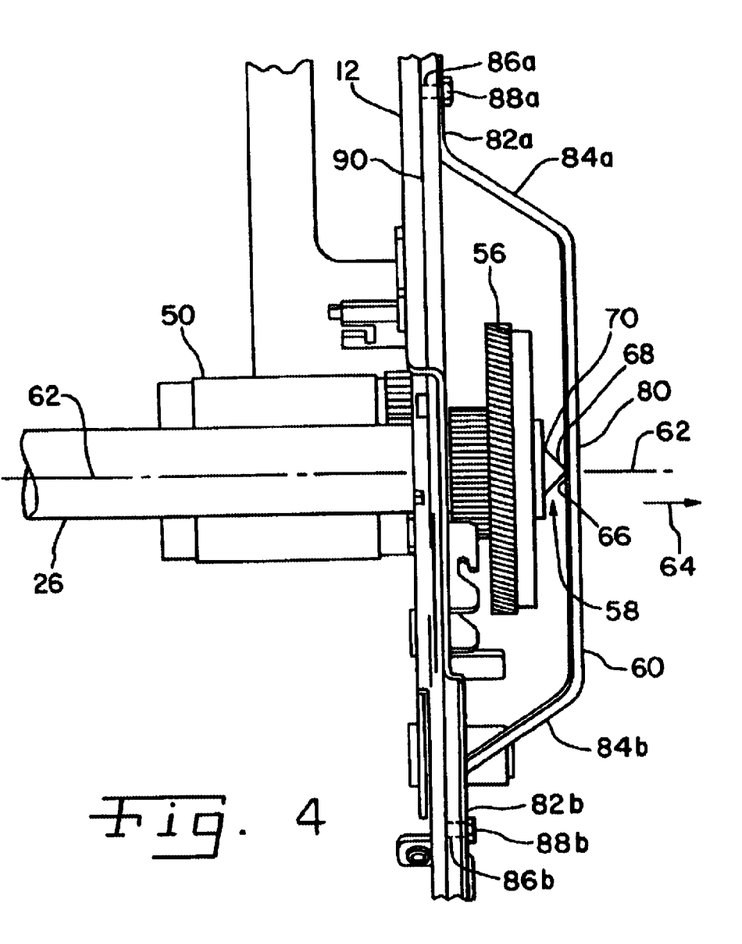
FIG. 4 is a side view of the invention depicted in FIG. 2.
Figure 8A:
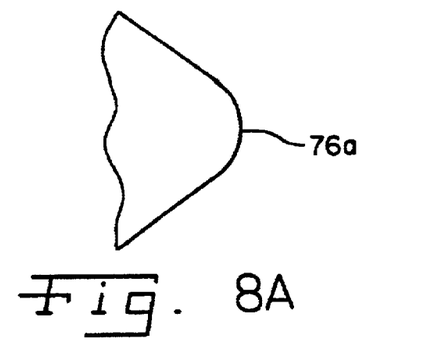
FIG. 8A is a partial side view of one embodiment of the tip portion of the thrust member shown in FIGS. 3 and 4.
Figure 8B:
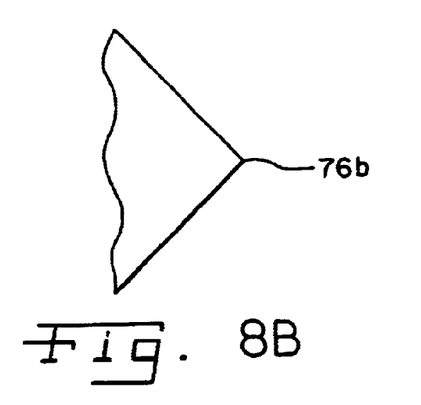
FIG. 8B is a partial side view of another embodiment of the tip portion of the thrust member shown in FIGS. 3 and 4.
Figure 9:
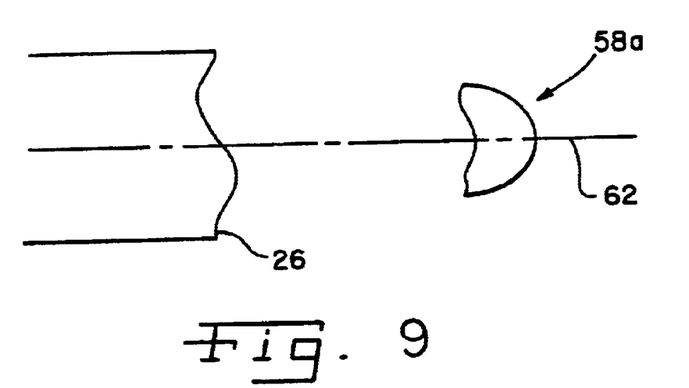
FIG. 9 is a side view of another embodiment of the thrust member of the invention.

As shown in FIG. 4, thrust member 58 is positioned to be co-axial along axis 62 with feed roller 26, and thus, thrust member 58 may be coupled to either driven end 48 of feed roller 26 or to driven helical gear 56, thereby serving as an end cap therefor. Preferably, however, thrust member 58 is mounted to driven helical gear 56 by pressing a portion of mounting end 70 into a hole in driven helical gear 56. Preferably, thrust member 58 has a conical configuration that is concentric with respect to feed roller 26, and in turn, axis 62, in which case dimensions 72, 74 are diameters of two of the concentric circles forming the conical configuration (see also FIG. 3). Also, preferably, as shown in FIG. 3, at least a tip portion 76 of thrust member 58 has a substantially spherical shape 76a (see FIG. 8A) so as to reduce the friction between engagement end 68 and contact surface 66 of thrust bracket 60. Alternatively, it is contemplated that tip portion 76 can have a conical shape 76b (see FIG. 8B). Also, alternatively, it is contemplated that thrust member 58 could have a spherical configuration 58a(see FIG. 9) that is concentric with feed roller 26. FIG. 3). Also, preferably, as shown in FIG. 3, at least a tip portion 76 of thrust member 58 has a substantially spherical shape so as to reduce the friction between engagement end 68 and contact surface 66 of thrust bracket 60. Alternatively, it is contemplated that tip portion 76 can have a conical shape. Also, alternatively, it is contemplated that thrust member 58 could have a spherical configuration that is concentric with feed roller 26.

It is further contemplated that thrust member 58 may be formed integral with either feed roller 26 or driven helical gear 56. Preferably, at least an outer surface 78 of thrust member 58 is made of half hard stainless steel, although other similarly hard or harder metals or materials, such as ceramics, could be used.

Thrust bracket 60 limits motion of thrust member 58 in axial direction 64 by providing an absolute stop for the tip portion 76 of thrust member 58 in axial direction 64. The point of contact of thrust member 58 with contact surface 66 of thrust bracket 60 is a point positioned on the centerline, i.e., axis 62, of feed roller 26. Thus, once tip portion 76 of thrust member 58 contacts contact surface 66 of thrust bracket 60 as feed roller 26 rotates in direction 46, the amount of run out of feed roller 26 is effectively held to zero.

Preferably, axial contact surface 66 is made of steel, such as half hard stainless steel, but other similarly hard or harder metals or materials, such as ceramics, could be used. As shown in FIGS. 2 and 4, thrust bracket 60 is formed from an elongated metal strap having a central portion 80 that is offset from end portions 82a, 82b by angularly extending intermediate portions 84a, 84b, respectively. As shown in FIG. 4, each of end portions 82a, 82b have a corresponding hole 86a, 86b to facilitate fastener attachment of thrust bracket 60 to printer frame 12. Such fasteners 88a, 88b can be, for example, bolts, screws, etc. When attached to printer frame 12, contact surface 66 of thrust bracket 60 is spaced away from a plane 90 of printer frame 12, and is positioned to be perpendicular to axis 62 of feed roller 26.

Figure 5:
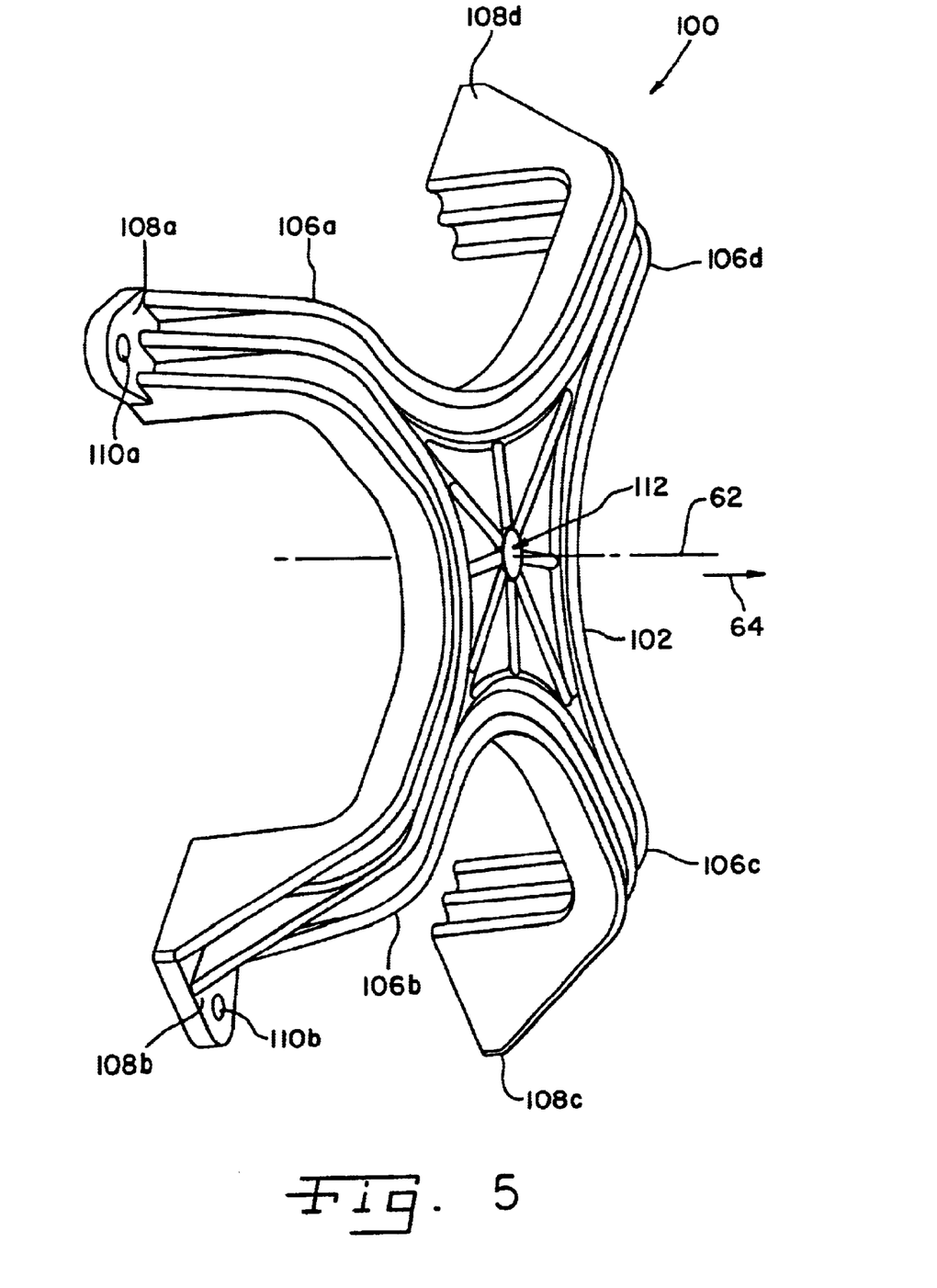
FIG. 5 is a perspective view of a second embodiment of the thrust bracket of the invention.
Figure 6:
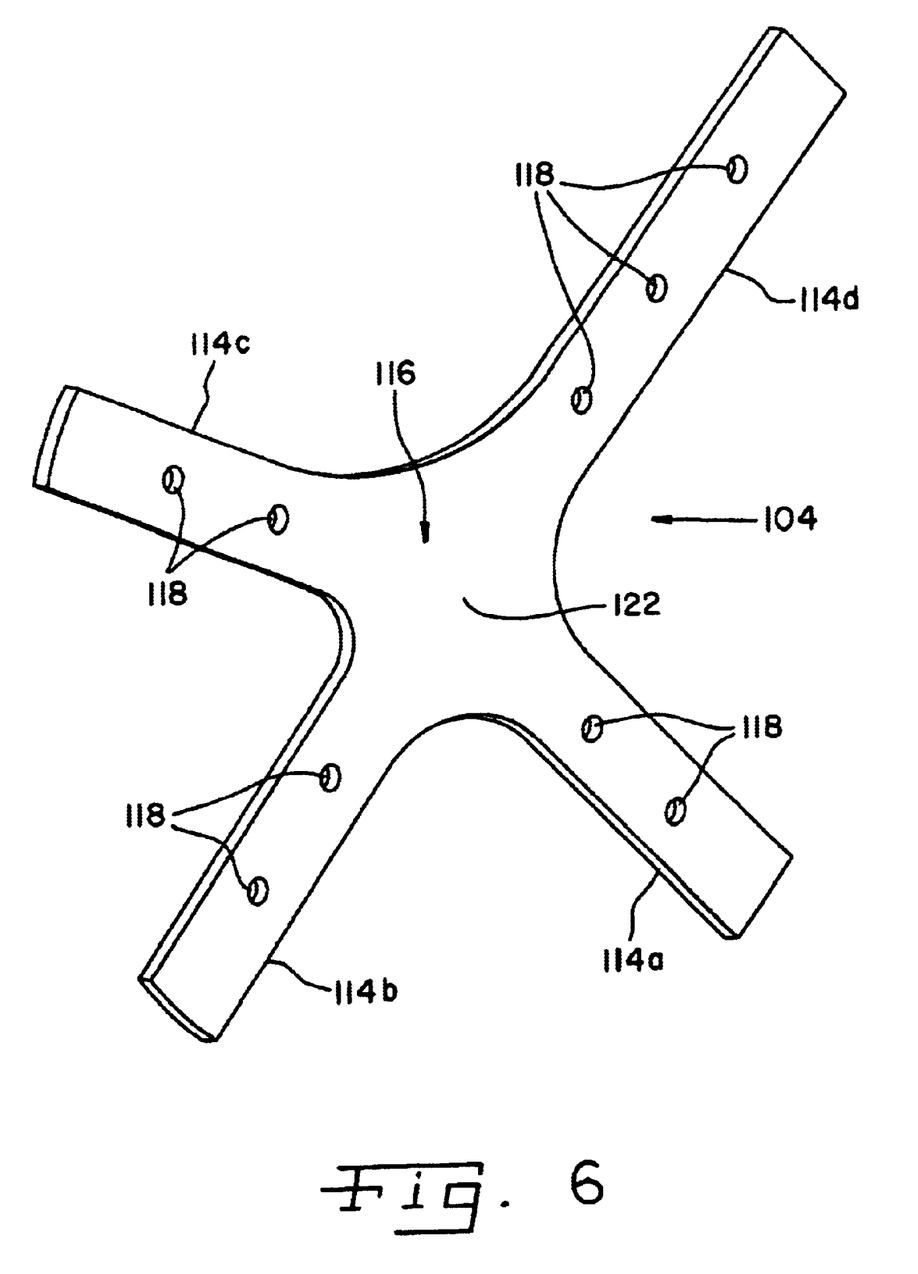
FIG. 6 is a perspective view of a contact body included in the thrust bracket of FIG. 5.
Figure 7:
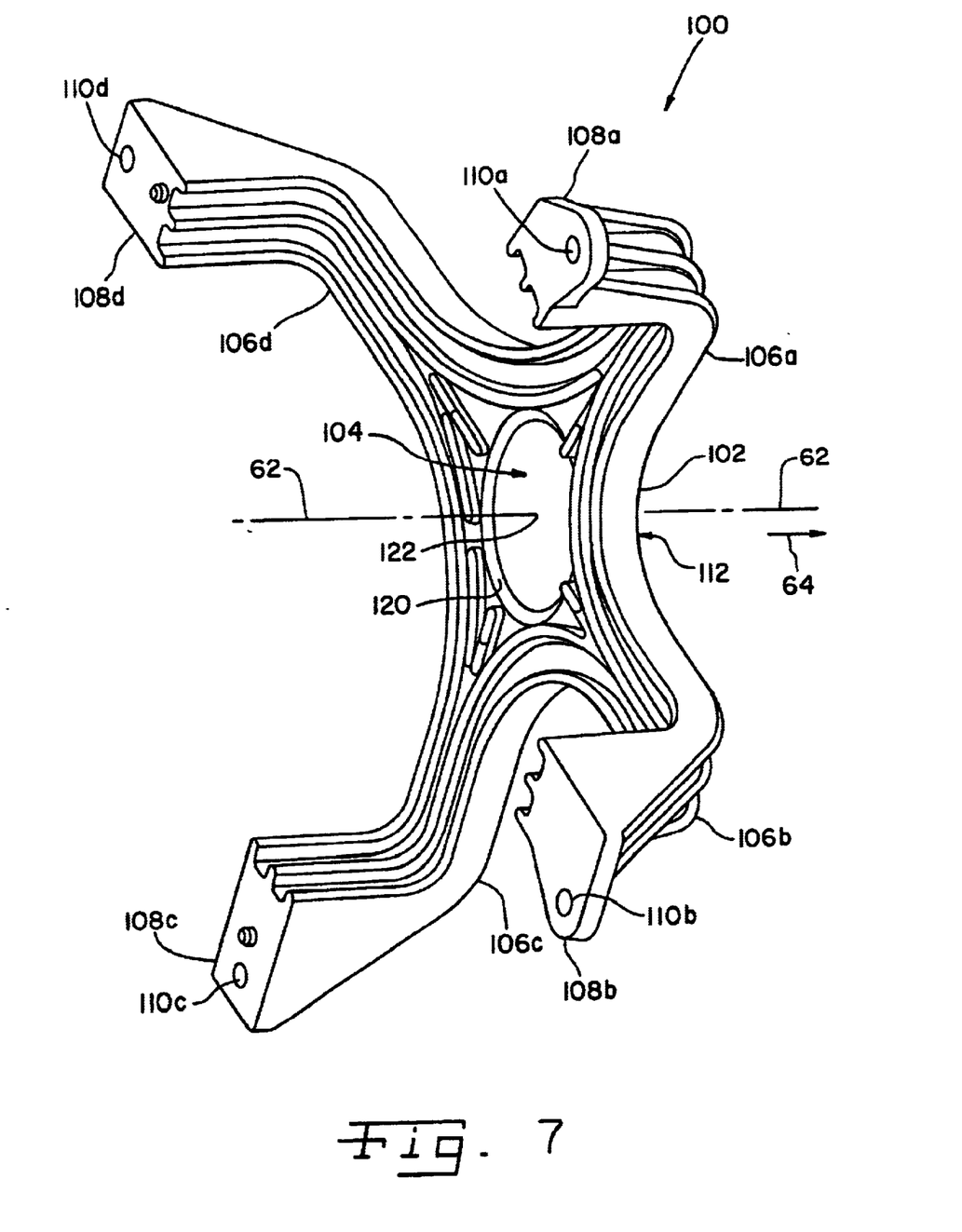
FIG. 7 is a perspective view of the thrust bracket depicted in FIG. 5, and rotated to show the contact surface of the contact body depicted in FIG. 6.

FIGS. 5–7 show another embodiment of a thrust bracket 100 according to the invention. In this embodiment, thrust bracket 100 includes a mounting body 102 (see FIGS. 5 and 7) and a contact body 104 (see FIGS. 6 and 7). Mounting body 102 provides support for contact body 104, and includes a plurality of mounting legs 106a, 106b, 106c, 106d, each of which include an end portion 108a, 108b, 108c, 108d, respectively. Each of end portions 108a, 108b, 108c, 108d have a hole 110a, 110b, 110c, 110d to facilitate fastener attachment to printer frame 12. Such fasteners can be, for example, bolts, screws, etc. As shown in the preferred embodiment, the shape of mounting legs 106a, 106b, 106c, 106d is selected so that a central portion 112 of thrust bracket 100 is offset along axis 62 from end portions 108a, 108b, 108c, 108d, which aids in providing increased rigidity within thrust bracket 100 in a direction parallel to axial thrust direction 64 when mounted to printer frame 12.

Preferably, mounting body 102 is made of a high strength plastic, such as for example, a thermoplastic polyester resin. One such suitable thermoplastic polyester resin is Rynite® 545 BK504 available from DuPont. Also, preferably, contact body 104 is made from a metal, such as half hard stainless steel.

Thrust bracket 100 is manufactured by insert-molding contact body 104 with plastic mounting body 102. Referring now to FIG. 6, contact body 104 is shown to include a plurality of extension portions 114a, 114b, 114c, 114d which extend outwardly from a central portion 116. Included in each extension portion 114a, 114b, 114c, 114d is a plurality of holes 118. During manufacture, contact body 104 in inserted into a mold, which in turn is filled with molten plastic. The molten plastic flows around extension portions 114, and through the plurality of holes 118. Accordingly, after the plastic hardens, contact body 104 is fixedly attached to mounting body 102. As shown in FIG. 7, a recessed region 120 is formed that exposes a contact surface 122 of contact body 104. Preferably, recessed region 120 is formed by blocking off the flow of molten plastic to the region associated with contact surface 122. Alternatively, contact surface 122 could be exposed by removing the plastic which flows over contact surface 122. The function of contact surface 122 of the embodiment of FIGS. 5–7 is analogous to the function of contact surface 66 of the embodiments of FIGS. 1–4, and thus, the discussion set forth above relating to contact surface 66 also applies to contact surface 122.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An assembly for limiting axial motion of a shaft in an imaging apparatus, said imaging apparatus having a frame, a drive system including a helical drive gear, a shaft supported by said frame, and a driven helical gear attached to said shaft and positioned to engage said helical drive gear, wherein driving said driven helical gear in a first rotational direction results in an axial thrust of said shaft in a first axial direction, said assembly comprising:

a thrust member having an engagement end and a mounting end, said engagement end having a first cross-sectional dimension and said mounting end having a second cross-sectional dimension that is larger than said first cross-sectional dimension, said thrust member being positioned to be co-axial with said shaft and coupled to at least one of said shaft and said driven helical gear; and a thrust bracket mounted to said frame, said bracket having a contact surface which is engaged by said engagement end of said thrust member when said driven helical gear is driven in said first rotational direction.

2. The assembly of claim 1, wherein said thrust bracket includes a mounting body, and a contact body that includes said contact surface, said mounting body being configured to support said contact body.

3. The assembly of claim 2, wherein said mounting body is made of plastic and said contact body is made of metal.

4. The assembly of claim 3, wherein said mounting body includes a recessed region which exposes said contact surface of said contact body.

5. The assembly of claim 1, wherein said thrust member forms an end cap for one of said driven helical gear and said shaft.

6. The assembly of claim 1, wherein said thrust member has a conical configuration that is concentric with said shaft.

7. The assembly of claim 1, wherein said thrust member has a spherical configuration that is concentric with said shaft.

8. The assembly of claim 1, wherein said engagement end has a tip having one of a substantially spherical shape and a conical shape.

9. The assembly of claim 1, wherein said thrust member is formed integral with one of said shaft and said driven helical gear.

10. The assembly of claim 1, wherein said contact surface of said thrust bracket is made of steel.

11. An imaging apparatus, comprising:

a frame;

a drive system connected to said frame, said drive system including a helical drive gear;

a shaft supported by said frame;

a driven helical gear attached to said shaft and positioned to engage said helical drive gear, wherein driving said driven helical gear in a first rotational direction results in an axial thrust of said shaft in a first axial direction;

a thrust member having an engagement end and a mounting end, said engagement end having a first cross-sectional dimension and said mounting end having a second cross-sectional dimension that is larger than said first cross-sectional dimension, said thrust member being positioned to be co-axial with said shaft and coupled to at least one of said shaft and said driven helical gear; and a bracket mounted to said frame, said bracket having a contact surface which is engaged by said engagement end of said thrust member when said driven helical gear is driven in said first rotational direction.

12. The apparatus of claim 11, wherein said bracket includes a mounting body and a contact body that includes said contact surface, said mounting body being configured to support said contact body.

13. The apparatus of claim 12, wherein said mounting body is made of plastic and said contact body is made of metal.

14. The apparatus of claim 13, wherein said mounting body includes a recessed region which exposes said contact surface of said contact body.

15. The apparatus of claim 11, wherein said thrust member forms an end cap for one of said driven helical gear and said shaft.

16. The apparatus of claim 11, wherein said thrust member has a conical configuration that is concentric with said shaft.

17. The apparatus of claim 11, wherein said thrust member has a spherical configuration that is concentric with said shaft.

18. The apparatus of claim 11, wherein said engagement end has a tip having one of a substantially spherical shape and a conical shape.

19. The apparatus of claim 11, wherein said thrust member is formed integral with one of said shaft and said driven helical gear.

20. The apparatus of claim 11, wherein said contact surface of said bracket is made of steel.

21. The apparatus of claim 11, wherein said shaft is a feed roller shaft.

* * * * *